US012276929B2

(12) United States Patent
Kobayashi et al.

(10) Patent No.: US 12,276,929 B2
(45) Date of Patent: Apr. 15, 2025

(54) IMAGE FORMING APPARATUS

(71) Applicant: CANON KABUSHIKI KAISHA, Tokyo (JP)

(72) Inventors: Shinsuke Kobayashi, Kanagawa (JP); Toshihiko Takayama, Kanagawa (JP); Shuichi Tetsuno, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/439,076

(22) Filed: Feb. 12, 2024

(65) Prior Publication Data

US 2024/0288813 A1 Aug. 29, 2024

(30) Foreign Application Priority Data

Feb. 27, 2023 (JP) ................................. 2023-027943

(51) Int. Cl.

| | |
|---|---|
| ***G03G 15/00*** | (2006.01) |
| ***G03G 15/02*** | (2006.01) |
| ***G03G 21/00*** | (2006.01) |
| ***G03G 21/16*** | (2006.01) |

(52) U.S. Cl.

CPC ..... *G03G 15/5008* (2013.01); *G03G 15/0233* (2013.01); *G03G 15/5012* (2013.01); *G03G 21/0035* (2013.01); *G03G 21/0094* (2013.01); *G03G 21/1638* (2013.01)

(58) Field of Classification Search

CPC ........... G03G 15/5008; G03G 15/5012; G03G 15/0233; G03G 21/0035; G03G 21/0094; G03G 21/1638

See application file for complete search history.

(56) References Cited

U.S. PATENT DOCUMENTS

| | | | | |
|---|---|---|---|---|
| 2019/0187602 A1* | 6/2019 | Nohara | .............. | G03G 21/1676 |
| 2023/0008258 A1* | 1/2023 | Takagi | ............... | G03G 15/2035 |
| 2024/0134311 A1* | 4/2024 | Fujita | ................. | G03G 15/0258 |

FOREIGN PATENT DOCUMENTS

| | | | |
|---|---|---|---|
| JP | 2002372878 | A | 12/2002 |
| JP | 2004252180 | A | 9/2004 |
| JP | 2009075259 | A | 4/2009 |
| JP | 2021189358 | A | 12/2021 |

* cited by examiner

*Primary Examiner* — Joseph S Wong

(74) *Attorney, Agent, or Firm* — Canon U.S.A., Inc. IP Division

(57) ABSTRACT

An image forming apparatus to perform an image forming operation of forming an image on a transferred material includes a photosensitive drum, an exposure unit, a transfer member to form a transfer portion, a transfer voltage applying unit to apply a transfer voltage, an opening/closing member, a detection unit to detect information regarding a first movement or a second movement, and a control unit to execute the image forming operation and a non-image forming operation. Where the detection unit detects the first and second movements, in the non-image forming operation, the control unit rotates the photosensitive drum at least one rotation in a state where a surface of the photosensitive drum is exposed with light by the exposure unit and the transfer voltage is applied so an electrostatic force that causes toner charged to a positive polarity to be attracted to the transfer member is generated in the transfer portion.

22 Claims, 9 Drawing Sheets

IMAGE FORMING APPARATUS

BACKGROUND

Field

The present disclosure relates to an image forming apparatus, such as a laser printer, a copying machine, and a facsimile, that adopts an electrophotographic recording method.

Description of the Related Art

An image forming apparatus adopting an electrophotographic method forms an electrostatic latent image on a photosensitive drum as an image bearing member by uniformly charging the photosensitive drum and then exposing it with light according to an image pattern. Subsequently, the electrostatic latent image on the photosensitive drum is developed with toner to be visible and is transferred to a recording material such as paper. For example, Japanese Patent Application Laid-Open No. 2021-189358 discloses an image forming apparatus having an image carrier, an electrifying device, an exposure device, a developing device, and a transfer device that transfers the developer image from the image carrier to a transfer target body.

There are conventional image forming apparatuses that employ a cleaner-less method in which a developing unit collects toner to a developing device and reuses it as measures for collecting transfer residual toner remaining on a photosensitive drum. However, in a case where a jam occurs in such conventional image forming apparatuses due to a delay in feeding of a recording material, a user opens a door on one side of an image forming apparatus and performs an operation to remove a jammed sheet. At this time, an image defect may occur due to, for example, a foreign substance or the like adhering to a surface of a photosensitive drum.

SUMMARY

The present disclosure is directed to suppression of an image defect due to failure occurring in a photosensitive drum.

According to an aspect of the present disclosure, an image forming apparatus to perform an image forming operation of forming an image on a transferred material, the image forming apparatus includes a photosensitive drum that is rotatable, a charging member configured to charge a surface of the photosensitive drum in a charging portion, an exposure unit configured to expose the surface of the photosensitive drum with light, a developing member configured to supply toner onto the surface of the photosensitive drum charged by the charging member, a transfer member configured to form a transfer portion by coming into contact with the photosensitive drum and to transfer the toner supplied onto the photosensitive drum to a transferred material in the transfer portion, a transfer voltage applying unit configured to apply a transfer voltage to the transfer member, an opening/closing member configured to move between an open position where an interior of the image forming apparatus is exposed and a shielding position where the interior of the image forming apparatus is shielded from being exposed, a detection unit configured to detect information regarding a first movement in which the opening/closing member moves from the shielding position to the open position or a second movement in which the opening/closing member moves from the open position to the shielding position, a drive unit configured to rotationally drive the photosensitive drum, and a control unit configured to control the transfer voltage applying unit and the drive unit, wherein the control unit is configured to perform control to execute the image forming operation and a non-image forming operation different from the image forming operation, and wherein, in a case where the detection unit detects the first movement and the second movement, in the non-image forming operation, the control unit controls to perform a rotation operation of rotating the photosensitive drum at least one rotation or more in a state where the surface of the photosensitive drum is exposed with light by the exposure unit and the transfer voltage is applied so that an electrostatic force that causes toner charged to a positive polarity to be attracted to the transfer member is generated in the transfer portion.

Further features of the present disclosure will become apparent from the following description of exemplary embodiments with reference to the attached drawings.

DESCRIPTION OF THE EMBODIMENTS

1. Image Forming Apparatus

Figure 1:
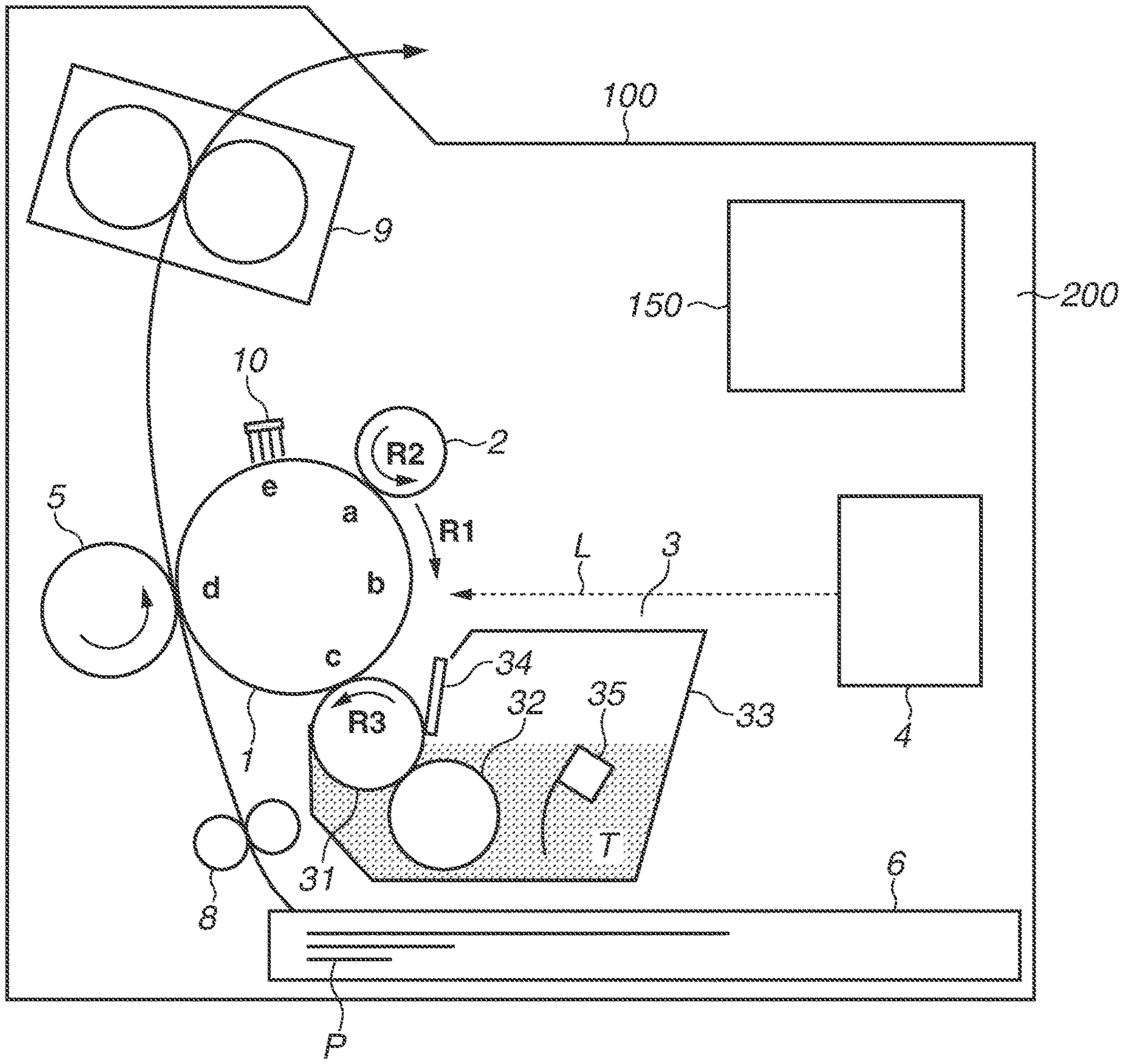
FIG. 1 illustrates an image forming apparatus according to a first exemplary embodiment.

FIG. 1 is a schematic configuration diagram of an image forming apparatus 100 according to a first exemplary embodiment of the present disclosure.

Figure 3:
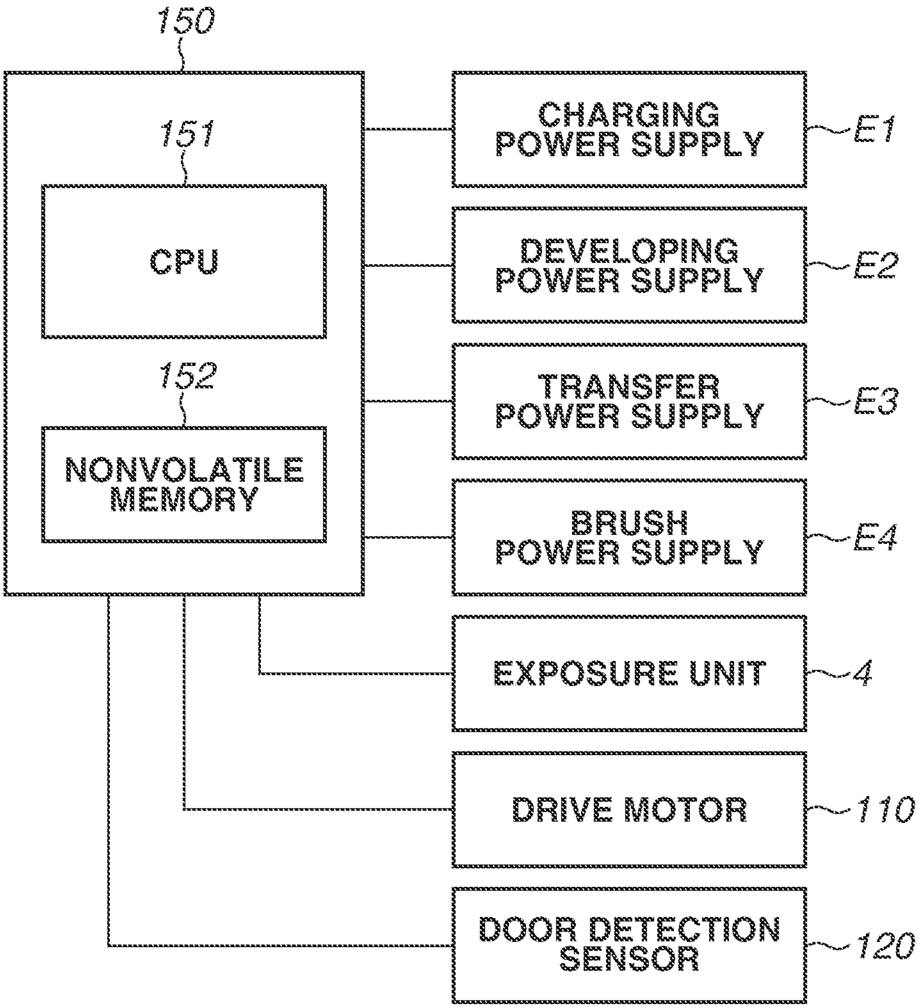
FIG. 3 illustrates a schematic control aspect of the image forming apparatus according to the first exemplary embodiment.

The image forming apparatus 100 according to the present exemplary embodiment is a monochrome laser beam printer that adopts a cleaner-less method and a contact charging method. The image forming apparatus 100 includes a photosensitive drum 1, which is a drum-shaped (cylindrical) electrophotographic photosensitive member as a rotatable image bearing member. If an image output operation is started, the photosensitive drum 1 is rotationally driven in a direction of an arrow R1 in FIG. 1 by a drive motor 110 (also referred to as a main motor 110) (FIG. 3). An outer diameter of the photosensitive drum 1 is 24 mm, and a peripheral speed (a surface speed) is 140 mm/s.

A surface of the rotating photosensitive drum 1 is uniformly charged to a predetermined potential with a normal polarity (a negative polarity in the present exemplary embodiment) by the charging roller 2, which is a roller-type charging member as a charging unit, near a charging portion a where the photosensitive drum 1 and the charging roller 2 are in contact with each other. More specifically, the charging roller 2 charges the surface of the photosensitive drum 1 by electric discharge occurring in at least one of minute gaps between the charging roller 2 and the photosensitive drum 1, which are formed upstream and downstream of a contact portion with the photosensitive drum 1 in a rotation direction of the photosensitive drum 1. However, here, it is described by assuming that a contact portion between the charging roller 2 and the photosensitive drum 1 in the rotation direction of the photosensitive drum 1 is a charging portion. The charging roller 2, which is an elastic roller with a conductive elastic layer provided around a core metal, is arranged in contact with the photosensitive drum 1, and is rotationally driven in a direction of an arrow R2 in FIG. 1 by the drive motor 110 (FIG. 3). According to the present exemplary embodiment, the charging roller 2 is driven to rotate, but it may be configured to rotate following rotation of the photosensitive drum 1. In addition, the drive motor 110 serves as a common drive source and rotationally drives the photosensitive drum 1 and the charging roller 2. The drive motor 110 may be provided separately for the photosensitive drum 1 and the charging roller 2. The charging roller 2 is applied with a predetermined charging voltage, which is a negative polarity direct current (DC) voltage, from a charging power supply E1 (FIG. 3) as a charging voltage applying unit. According to the present exemplary embodiment, the charging roller 2 is applied with the negative polarity DC voltage as a charging voltage during charging processing. The charging voltage according to the present exemplary embodiment is −1200 V, for example. Accordingly, according to the present exemplary embodiment, the surface of the photosensitive drum 1 is uniformly charged to a dark portion potential Vd of −600 V.

The charged surface of the photosensitive drum 1 is scanned and exposed with a laser beam L modulated according to image data by an exposure device (a laser exposure unit) 4 as an exposure unit (an electrostatic image forming unit). The exposure device 4 forms an electrostatic latent image on the photosensitive drum 1 by repeatedly exposing the photosensitive drum 1 with the laser beam L in a main scanning direction (a rotation axis direction) while performing exposure in a sub-scanning direction (a surface movement direction). According to the present exemplary embodiment, an absolute value of the dark portion potential Vd on the surface of the photosensitive drum 1, which is formed by being uniformly charged, decreases due to exposure by the exposure device 4, and becomes a light portion potential V1 of −100 V. In the rotation direction of the photosensitive drum 1, an exposure position of the exposure device 4 on the photosensitive drum 1 is an image exposure portion b. The exposure device 4 is not limited to a laser scanner device, and for example, a light-emitting diode (LED) array may be adopted in which a plurality of LEDs is arranged along a longitudinal direction of the photosensitive drum 1.

The electrostatic latent image formed on the photosensitive drum 1 is developed (visualized) as a toner image using toner as developer by a developing device 3 as a developing unit. The toner used as developer according to the present exemplary embodiment is a spherical non-magnetic toner with an average particle size of 6.4 μm and an average circularity of 0.98. The average circularity of the non-magnetic toner used in the present exemplary embodiment is desirable to be higher and, specifically, to be 0.96 or more. The average circularity according to the present exemplary embodiment is used as a simple method for quantitatively expressing a shape of particle and is determined by measuring a particle shape using a flow type particle image analyzer FPIA-2100 manufactured by Toa Medical Electronics Co., Ltd., and calculating the circularity using a following formula 1.

$$\text{Circularity } (Ci) = \frac{\text{Perimeter of a circle with the same projected area as the number of particles}}{\text{Perimeter of projected image of particle}} \quad \text{(Formula 1)}$$

Further, as expressed in a following formula 2, the average circularity is defined as a sum of the circularity of all measured particles divided by the total number of particles.

$$\text{Average circularity } (\overline{C}) = \sum_{i=m}^{m} Ci/m \quad \text{(Formula 2)}$$

The developing device 3 includes a developing roller 31 as a developer carrying member, a toner supply roller 32 as a developer supply unit, a developer chamber 33 that stores toner, and a developing blade 34. The toner stored in the developer chamber 33 is stirred by a stirring member 35 and is supplied to a surface of the developing roller 31 by the toner supply roller 32. The toner supplied to the surface of the developing roller 31 is uniformly thinned by passing through a contact portion between the developing roller 31 and the developing blade 34 and is charged to a negative polarity due to abrasion. According to the present exemplary embodiment, a one-component non-magnetic contact developing method is used, but the method is not limited to this, and a two-component non-magnetic contact method and a non-contact developing method may also be adopted. A magnetic developing method may also be adopted. According to the present exemplary embodiment, a normal polarity of toner is described as a negative polarity, but it is not limited to the negative polarity. The normal polarity may be a positive polarity, and in this case, a voltage relationship and the like described below may be appropriately set to an opposite polarity. The developing roller 31 is rotationally driven by the drive motor 110 in a counterclockwise direction, which is a direction of an arrow R3 in FIG. 1 so that movement directions of the surface of the photosensitive drum 1 and the surface of the developing roller 31 are the same at a developing portion c where the photosensitive drum 1 and the developing roller 31 come into contact with each other. The drive motor 110 as the drive unit that drives the developing roller 31 may be a main motor common to the drive unit of the photosensitive drum 1, or separate drive motors may rotate the photosensitive drum 1 and the developing roller 31, respectively. The developing roller 31 is applied with a predetermined developing voltage (a developing bias) by a developing power supply E2 (FIG. 3) as a developing voltage applying unit during development. According to the present exemplary embodiment, the developing roller 31 is applied with a DC voltage with a negative polarity as the developing voltage, and the developing voltage during development is −300 V. According to the present exemplary embodiment, toner negatively charged, which is the same polarity as the charging polarity of the photosensitive drum 1, adheres to an exposure surface, which is an image forming portion on the photosensitive drum 1 where the absolute value of the potential is decreased by being exposed with light after being uniformly charged. This developing method is referred to as a reversal developing method.

According to the present exemplary embodiment, the developing roller 31 is configured to be constantly in contact with the photosensitive drum 1 in the developing portion c, but the developing roller 31 and the photosensitive drum 1 may be configured to be in contact with and separated from each other. In this case, a developing contact and separation mechanism may be provided separately. During a rotation operation, which is a pre-rotation process described below, the photosensitive drum 1 may be rotated in a state where the developing roller 31 is separated from the photosensitive drum 1.

A toner image formed on the photosensitive drum 1 is conveyed to a transfer portion d, which is a contact portion between the photosensitive drum 1 and a transfer roller 5, which is a roller-type transfer member serving as a transfer unit. The transfer roller 5 according to the present exemplary embodiment is a roller made of conductive nitrile butadiene rubber (NBR) and hydrin type sponge rubber with an outer diameter of 12 mm and a hardness of 30° (Asker-C, 500 gf load), and is pressed against the photosensitive drum 1 with a predetermined pressure. On the other hand, a recording material P, which is a transferred material, is conveyed from a sheet feeding tray 6 as a storage unit to the transfer portion d by a conveyance roller 8 and the like by matching timing with the toner image on the photosensitive drum 1. Then, the toner image on the photosensitive drum 1 is transferred onto the recording material P, which is pinched between the photosensitive drum 1 and the transfer roller 5 and conveyed, by an action of the transfer roller 5 at the transfer portion d. At this time, a predetermined transfer voltage, which is a DC voltage having a polarity opposite to the normal polarity of the toner (a positive polarity according to the present exemplary embodiment) is applied to the transfer roller 5 from a transfer power supply E3 (FIG. 3). Accordingly, an electric field is formed between the transfer roller 5 and the photosensitive drum 1, and the toner image is electrostatically transferred from the photosensitive drum 1 to the recording material P. According to the present exemplary embodiment, the transfer voltage during this transfer is, for example, +1000 V. Then, the toner image is electrostatically transferred from the photosensitive drum 1 to the recording material P by an action of the electric field formed between the transfer roller 5 and the photosensitive drum 1.

The recording material P to which the toner image is transferred is conveyed to a fixing device 9 as a fixing unit. The fixing device 9 applies heat and pressure to the recording material P, so that the toner image is fixed to the recording material P.

On the other hand, transfer residual toner remaining on the photosensitive drum 1 without being transferred to the recording material P passes through a brush portion e, which is a contact portion between the photosensitive drum 1 and a brush member 10 installed downstream of the transfer roller 5 in the rotation direction of the photosensitive drum 1, and is charged to the negative polarity again by electric discharge at the charging portion a. The negatively charged transfer residual toner reaches the developing portion c as the photosensitive drum 1 rotates, and is collected by the developing device 3. The brush member 10 according to the present exemplary embodiment is described below.

2. Configuration of Brush Member

Next, a configuration of the brush member 10 according to the present exemplary embodiment is described with reference to FIGS. 2A, 2B, and 2C. As illustrated in FIG. 1, the brush member 10 according to the present exemplary embodiment is fixed and arranged in contact with the surface of the photosensitive drum 1 downstream of the transfer portion d and upstream of the charging portion a in the rotation direction of the photosensitive drum 1.

Figure 2A:
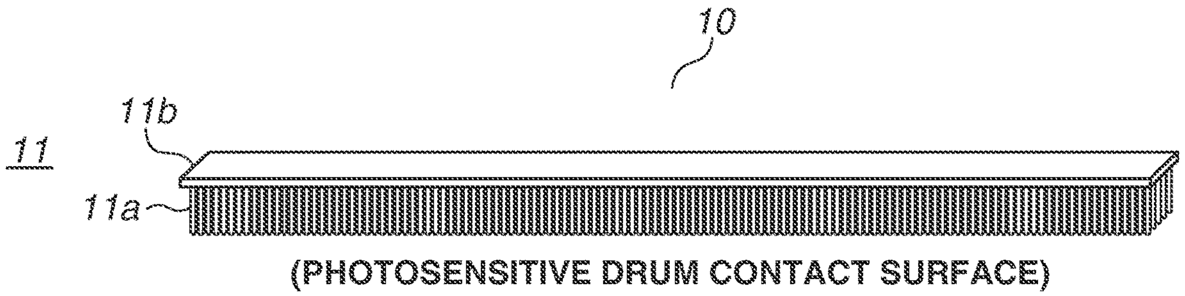
FIGS. 2A, 2B, and 2C are schematic diagrams of a brush member according to the first exemplary embodiment.

FIG. 2A illustrates an external appearance of the brush member 10. FIG. 2B is a schematic diagram of the brush member 10 in a single state viewed along its longitudinal direction (substantially parallel to a rotational axis direction of the photosensitive drum 1). FIG. 2C is a schematic diagram of the brush member 10 in contact with the photosensitive drum 1 viewed along its longitudinal direction.

The brush member 10 includes a brush portion that is configured with a conductive fixed brush 11 that is fixedly arranged. The fixed brush 11 is configured with conductive threads 11*a* made of conductive nylon 6 woven into a base fabric 11*b* made of synthetic fibers including carbon as a conductive agent. The fixed brush 11 is arranged to be in contact with the photosensitive drum 1 so that its longitudinal direction is parallel to the rotational axis direction of the photosensitive drum 1. Further, the fixed brush 11 is arranged to be in contact with the photosensitive drum 1 so that its transverse direction is parallel to the rotation direction of the photosensitive drum 1. Furthermore, the fixed brush 11 is connected to a brush power supply E4 (FIG. 3) as a brush voltage applying unit.

Figure 2B:
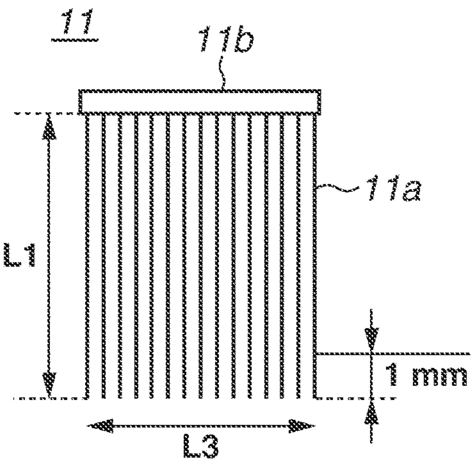
Figure 2C:
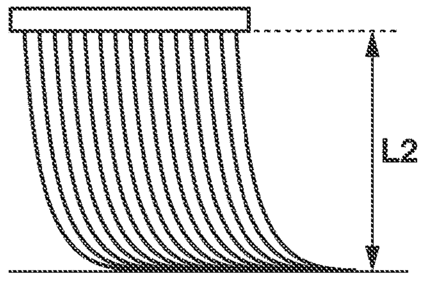

As illustrated in FIG. 2B, in a state of the single fixed brush 11, that is, a state where no external force is applied to bend the conductive thread 11*a*, a distance from the base fabric 11*b* to a tip of the conductive thread 11*a* exposed therefrom is L1. According to the present exemplary embodiment, the distance L1 is 6.5 mm. The base fabric 11*b* of the fixed brush 11 is fixed to a support member (not illustrated) arranged at a predetermined position of the image forming apparatus 100 using fixing devices such as a double-sided adhesive tape, and the conductive threads 11*a* are arranged so that the tips enter the photosensitive drum 1. According to the present exemplary embodiment, a clearance between the above-described support member and the photosensitive drum 1 is fixed. Further, as illustrated in FIG. 2C, a shortest distance from the base fabric 11*b* of the fixed brush 11 fixed to the above-described support member to the photosensitive drum 1 is L2. According to the present exemplary embodiment, a difference between the distance L2 and the distance L1 is defined as an entering amount of the fixed brush 11 into the photosensitive drum 1, and the entering amount is 1 mm. According to the present exemplary embodiment, as illustrated in FIG. 2B, a length L3 of the fixed brush 11 in a circumferential direction (hereinbelow referred to as "transverse direction") of the photosensitive drum 1 is 5 mm.

According to the present exemplary embodiment, a length of the fixed brush 11 in the longitudinal direction is 216 mm. Accordingly, the fixed brush 11 can come into contact with an entire area of an image forming area (an area where a toner image can be formed) on the photosensitive drum 1 in the rotational axis direction of the photosensitive drum 1. Further, according to the present exemplary embodiment, the conductive thread 11*a* has a thickness of 2 denier and a density of 240 $kF/inch^2$ ($kF/inch^2$ is a unit of brush density, indicating the number of filaments per square inch). It is desirable that the density of the conductive threads 11*a* of the fixed brush 11 is 150 $kF/inch^2$ or more.

According to the present exemplary embodiment, the length L3 of the fixed brush 11 in the circumferential direction (hereinbelow, the transverse direction) of the photosensitive drum 1 is set to 5 mm, but the present disclosure is not limited to this. The length L3 may be changed appropriately, for example, according to a service life of the image forming apparatus or a process cartridge. Further, the length in the longitudinal direction of the fixed brush 11 according to the present exemplary embodiment is set to 216 mm, but the present disclosure is not limited to this. The length may be changed appropriately, for example, according to a maximum sheet passing width of the image forming apparatus.

3. Image Output Operation

According to the present exemplary embodiment, the image forming apparatus 100 executes an image output operation (a job), which is a series of operations of forming an image on a single or a plurality of recording materials P by a start instruction from an external apparatus (not illustrated) such as a personal computer. A job generally includes an image forming process (printing process), a pre-rotation process, a sheet interval process in a case of forming images on a plurality of recording materials P, and a post-rotation process. The image forming process is a period in which an electrostatic image is actually formed on the photosensitive drum 1, the electrostatic image is developed (forming a toner image), the toner image is transferred, the toner image is fixed, and the like, and this period is referred to as an image formation time. More specifically, timing of the image formation time is different depending on positions where the electrostatic image is formed, the toner image is formed, the toner image is transferred, the toner image is fixed, and the like. Thus, the image forming operation may be defined as an operation up to the transfer of the toner image or up to the fixing of the toner image. Even when the image forming operation performed on the photosensitive drum 1 is finished and the operation of the photosensitive drum 1 is switched from the image forming operation to a non-image forming operation, it will not affect the image already transferred to the recording material P, so that it may be defined as described above. The pre-rotation process is a period in which a preparation operation is performed before the image forming process. The sheet interval process is a period corresponding to an interval between the recording materials P in a case where the image forming process is continuously performed on a plurality of recording materials P (during continuous image formation). The post-rotation process is a period in which an organizing operation (preparation operation) is performed after the image forming process. A non-image formation time is a period other than the image formation time and includes the above-described pre-rotation process, sheet interval process, and post-rotation process, and also a pre-multi-rotation process, which is a preparation operation when the image forming apparatus 100 is turned on or returns from a sleep state.

4. Control Aspect

FIG. 3 is a schematic block diagram illustrating a control aspect of main parts of the image forming apparatus 100 according to the present exemplary embodiment. The image forming apparatus 100 is provided with a control unit 150. The control unit 150 includes a central processing unit (CPU) 151 as an arithmetic control unit, which is a central element that performs arithmetic processing, a nonvolatile memory 152 as a storage unit, and an input/output unit (not illustrated) that controls transmission and reception of signals between various elements connected to the control unit 150. The nonvolatile memory 152 is used to temporarily store control data or as a work area for arithmetic processing associated with control. According to the present exemplary embodiment, the nonvolatile memory 152 can store information about the number of continuously passed sheets in continuously passing a plurality of recording materials and information about the total number of passed sheets of the image forming apparatus 100.

The control unit 150 comprehensively controls the operation of the image forming apparatus 100. The control unit 150 controls transmission and reception of various electrical information signals and drive timing and executes a predetermined image forming sequence. The control unit 150 is connected to each unit of the image forming apparatus 100. For example, in a relationship according to the present exemplary embodiment, the control unit 150 is connected to the charging power supply E1, the developing power supply E2, the transfer power supply E3, the brush power supply E4, the drive motor 110, the exposure device 4 as an exposure unit, and the like.

5. Door Opening/Closing Mechanism

Figure 4A:
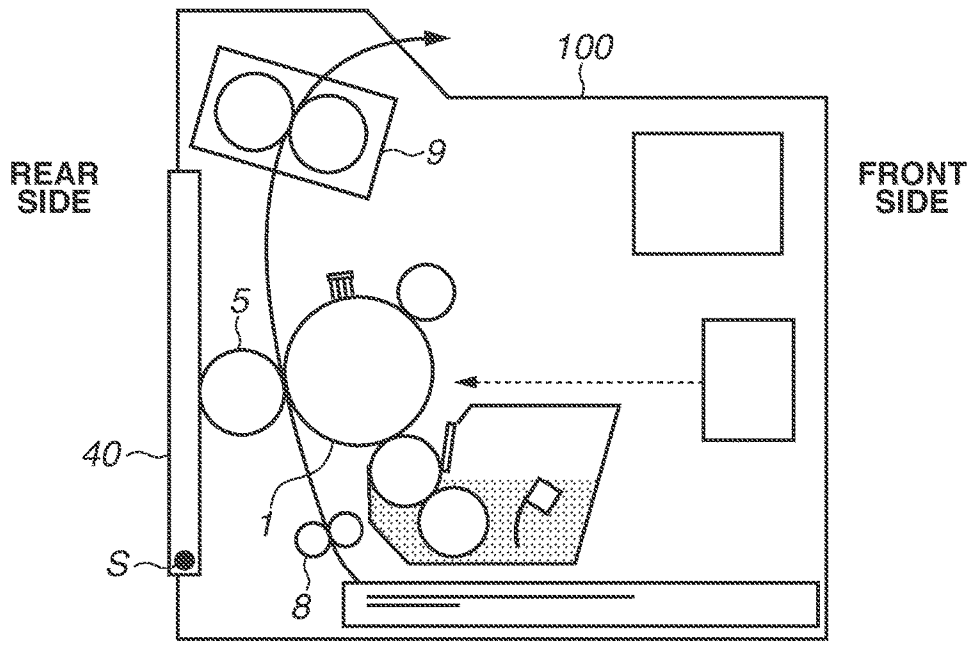
FIGS. 4A and 4B illustrate opening and closing of a rear side door according to the first exemplary embodiment.
Figure 4B:
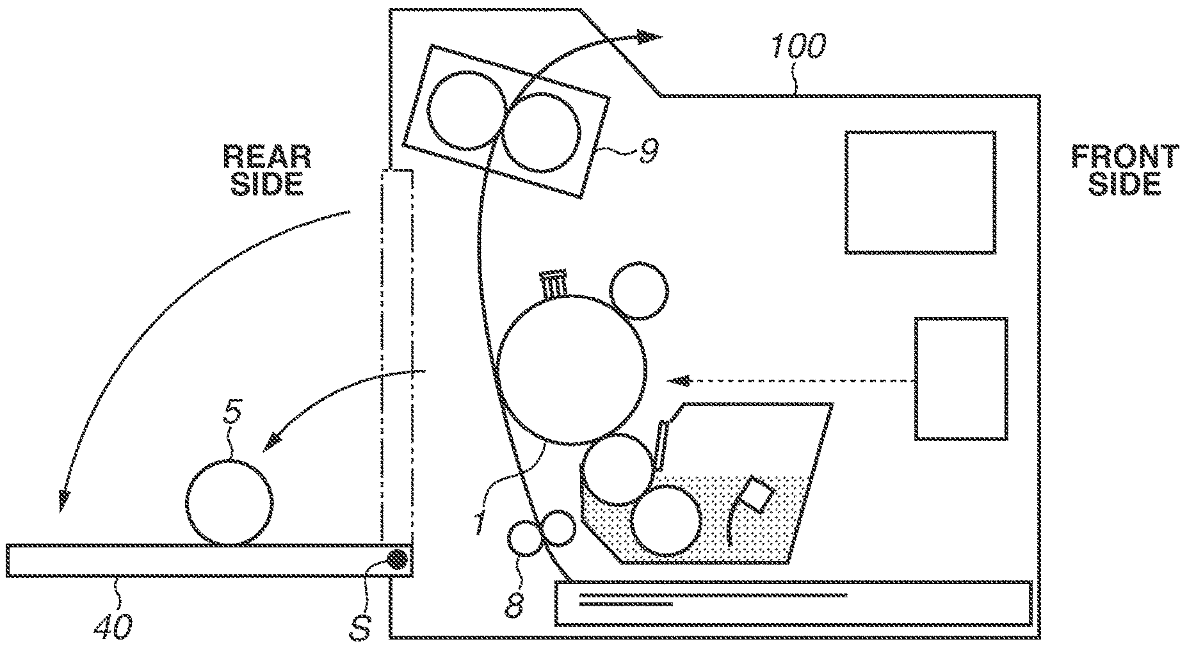

As illustrated in FIGS. 4A and 4B, the image forming apparatus 100 according to the present exemplary embodiment is provided with a rear side door 40 as an opening/closing member that can be freely opened and closed on a rear side of an apparatus main body 200 forming the image forming apparatus 100 so that a user can remove a jammed sheet during jam recovery processing. FIGS. 4A and 4B respectively illustrate a state in which the rear side door 40 is closed and a state in which the rear side door 40 is opened. As illustrated in FIG. 4B, the rear side door 40 is configured to be able to rotate up to 90 degrees with a fulcrum S as a rotation axis. Further, the transfer roller 5 is rotatably supported by a bearing member (not illustrated), and the bearing member is attached to the rear side door 40. Thus, the transfer roller 5 is configured to be movable following opening and closing of the rear side door 40. Accordingly, for example, if a jammed sheet is retained in the apparatus main body 200, a user can open the rear side door 40 and perform an operation of removing the jammed sheet in the apparatus main body 200.

However, on the other hand, when the user opens the rear side door 40, the photosensitive drum 1 is exposed.

Thus, a user's hand may touch the photosensitive drum 1, or surrounding dust may indirectly adhere to the surface of the photosensitive drum 1. Among adhering substances (hereinbelow, referred to as foreign substances) on the surface of the photosensitive drum 1, some have positive (plus) polarity and some have negative (minus) polarity. For example, human sebum and human hair have a positive (plus) polarity with respect to the charging polarity of the photosensitive drum 1 and have a property of being easily adsorbed on the surface of the photosensitive drum 1. If a foreign substance having the above-described property is maintained in a state adhering to the surface of the photosensitive drum 1, the foreign substance may firmly stick thereto and cause generation of a white spot due to injection overcharging in the charging portion a or a black spot in the developing portion c by attracting toner.

According to the present exemplary embodiment, a door detection sensor 120 as a door opening/closing sensor is provided as an opening/closing detection unit of the rear side door 40 and can detect whether the rear side door 40 is open or closed. In other words, the door detection sensor 120 can detect information regarding whether the rear side door 40 is in an open position where an interior of the image forming apparatus 100 is opened or in a shielding position where the interior of the image forming apparatus 100 is at least partially shielded. Specifically, the control unit 150 detects the state of the rear side door 40 based on a signal from the door detection sensor 120 that detects opening and closing of the rear side door 40. After the jam recovery processing is finished, the user completes the jam recovery processing by moving the rear side door 40 from the open position to the shielding position.

6. Initial Sequence Control in Opening/closing of Door

The image forming apparatus 100 according to the present exemplary embodiment is provided with the door detection sensor 120 that detects opening and closing of the rear side door 40 as illustrated in FIG. 3 by assuming the above-described possibility. If the rear side door 40 is opened and closed, the door detection sensor 120 detects it, and opening/closing information of the rear side door 40 is transmitted to the control unit 150. Then, in a case where the CPU 151 determines that the rear side door 40 is opened and closed, a drum cleaning operation is executed in an initial sequence immediately after to remove a foreign substance adhering to the surface of the photosensitive drum 1 therefrom. Accordingly, even when a foreign substance adheres to the surface of the photosensitive drum 1, it is possible to prevent the foreign substance from firmly sticking to the photosensitive drum 1 and to suppress an image defect associated with this.

The drum cleaning operation as a rotation operation in the initial sequence is described below.

<Drum Cleaning Operation>

Figure 5:
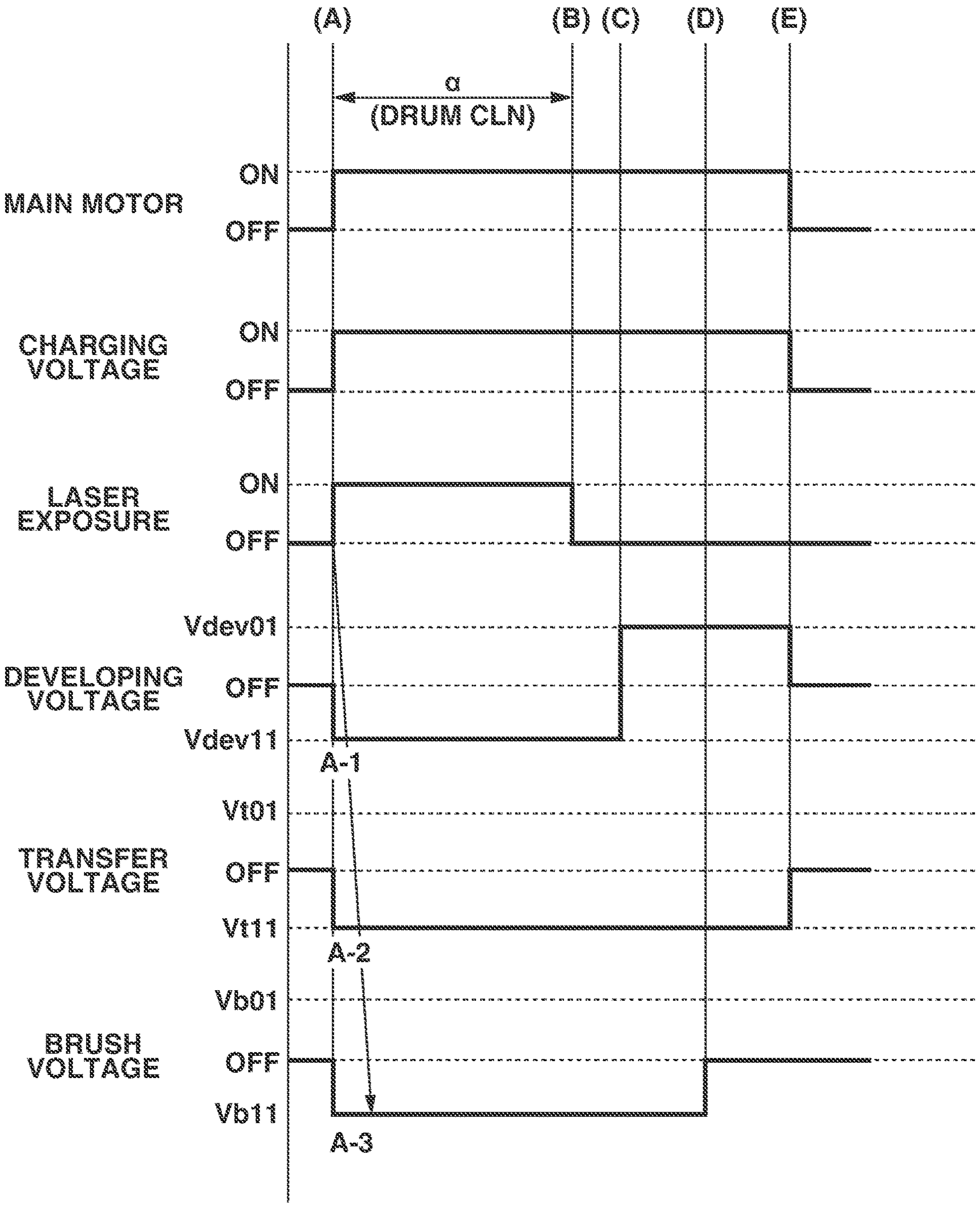
FIG. 5 is a timing chart of a non-image forming operation according to the first exemplary embodiment.

FIG. 5 is a timing chart of the initial sequence after the rear side door 40 according to the present exemplary embodiment is opened and closed. The present sequence is executed by the control unit 150 controlling an operation of each unit at timing illustrated in FIG. 5.

Upon determining that the rear side door 40 is opened and closed, the control unit 150 starts control of the initial sequence.

Timing (A) in FIG. 5 is a start timing of the initial sequence, and drive of the main motor is turned ON at the same time as the start.

At the same timing (A), the charging roller 2 is applied with a charging voltage of −1200 V, which is the same as that in the image formation time. This is because uncharged toner and the foreign substance adhering to the surface of the photosensitive drum 1 is turned to be negative by electric discharge in the charging portion a. However, at this time, the foreign substance that is difficult to turn to be negative, such as sebum and human hair, passes through the charging portion a while maintaining its positive polarity. The surface of the photosensitive drum 1 after passing through the charging portion a is uniformly charged to the dark portion potential Vd of −600 V.

At the same timing (A), laser exposure of the exposure device 4 is turned ON. Accordingly, the dark portion potential Vd of the surface of the photosensitive drum 1 formed by uniform charging becomes the light portion potential V1 of −100 V in the image exposure portion b. Accordingly, an electrostatic attraction force between the positive polarity foreign substance described above and the photosensitive drum 1 is reduced.

At the same timing (A), the developing roller 31 is applied with a developing voltage Vdev11 (+150 V) having a polarity opposite to that in the image formation time. Accordingly, a potential difference (250 V) with the light portion potential V1 of the surface of the photosensitive drum 1 is formed, so that the foreign substance turned to be negative can be collected. On the other hand, the foreign substance that is not turned to negative and maintains the positive polarity passes through the developing portion c without being collected by the developing roller 31.

At the same timing (A), the transfer roller 5 is applied with a transfer voltage Vt11 (−800 V) having a polarity opposite to that in the image formation time. Accordingly, the positive polarity foreign substance passing through the developing portion c is transferred from the photosensitive drum 1 to the transfer roller 5. However, some foreign substances are viscous and some are aggregated together, so that there are cases that the foreign substance passes through the transfer portion d without being transferred to the transfer roller 5.

According to the present exemplary embodiment, the transfer voltage Vt11 is set to −800 V, but the present disclosure is not limited to this. A bias may be on a negative polarity side with respect to the surface potential of the photosensitive drum 1, and may be, for example, a value that does not cause electric discharge in the transfer portion d.

At the same timing (A), the brush member 10 is applied with a brush voltage Vb11 (+150 V) having a polarity opposite to that in the image formation time. Accordingly, the positive polarity foreign substance remaining and adhering to the surface of the photosensitive drum 1 passes through without being collected in the brush portion e, and at the same time, is physically dispersed by the brush member 10. Accordingly, the foreign substance adhering to the surface of the photosensitive drum 1 can be easily collected by the transfer roller 5 and is suppressed from firmly sticking to the surface of the photosensitive drum 1. According to the present exemplary embodiment, the brush member 10 is applied with the brush voltage Vb11 (+150 V), but the present disclosure is not limited to this. It is sufficient that the foreign substance can be physically dispersed by the brush member 10, and it is not necessary to apply the brush voltage.

According to the present exemplary embodiment, the drive of the main motor 110 and various types of voltage control are turned ON simultaneously at the start timing (A) of the initial sequence, but the present disclosure is not limited to this. ON timing of the charging voltage and the developing voltage may be advanced depending on the drive of the main motor 110 and rise time of various voltages. For example, it is sufficient that the developing voltage rises to the developing voltage Vdev11 at timing (A-1) at which the light portion potential V1 area of the photosensitive drum 1 subjected to the laser exposure reaches the developing portion c. Further, it is sufficient that the transfer voltage rises to the transfer voltage Vt11 at timing (A-2) at which the light portion potential V1 area of the photosensitive drum 1 reaches the transfer portion d.

It is sufficient that the brush voltage rises to the brush voltage Vb11 at timing (A-3) at which the light portion potential V1 area of the photosensitive drum 1 reaches the brush portion e. Further, control may be performed to bring the potential of the photosensitive drum 1 close to the light portion potential V1 using, for example, a neutralization device 41 (FIG. 9), which is different from the exposure device 4, before the laser exposure of the exposure device 4 is started.

Timing (B) in FIG. 5 is timing at which the photosensitive drum 1 has rotated approximately three times from the timing (A). In other words, a time a from the timing (A) to the timing (B) is a drum cleaning time during which the foreign substance on the surface of the photosensitive drum 1 is physically dispersed in the brush portion e and collected by the transfer roller 5. According to the present exemplary embodiment, the drum cleaning time in the initial sequence is set to approximately three rotations of the photosensitive drum 1, but the present disclosure is not limited to this. The drum cleaning time may be changed as appropriate according to the material and formulation of the surface of the photosensitive drum 1 or the applied voltage. A degree of exposure of the photosensitive drum 1 differs depending on an environment in which a user opens and closes the rear side door 40. Thus, a degree to which the surface potential of the photosensitive drum 1 is neutralized differs, but it is desirable that the drum cleaning time is at least one rotation of the photosensitive drum 1 or more. This is because by cleaning the surface of the photosensitive drum 1 at least once, it is possible to suppress an image defect caused by opening and closing the rear side door 40 on any surface of an image area of the photosensitive drum 1.

Figure 6:
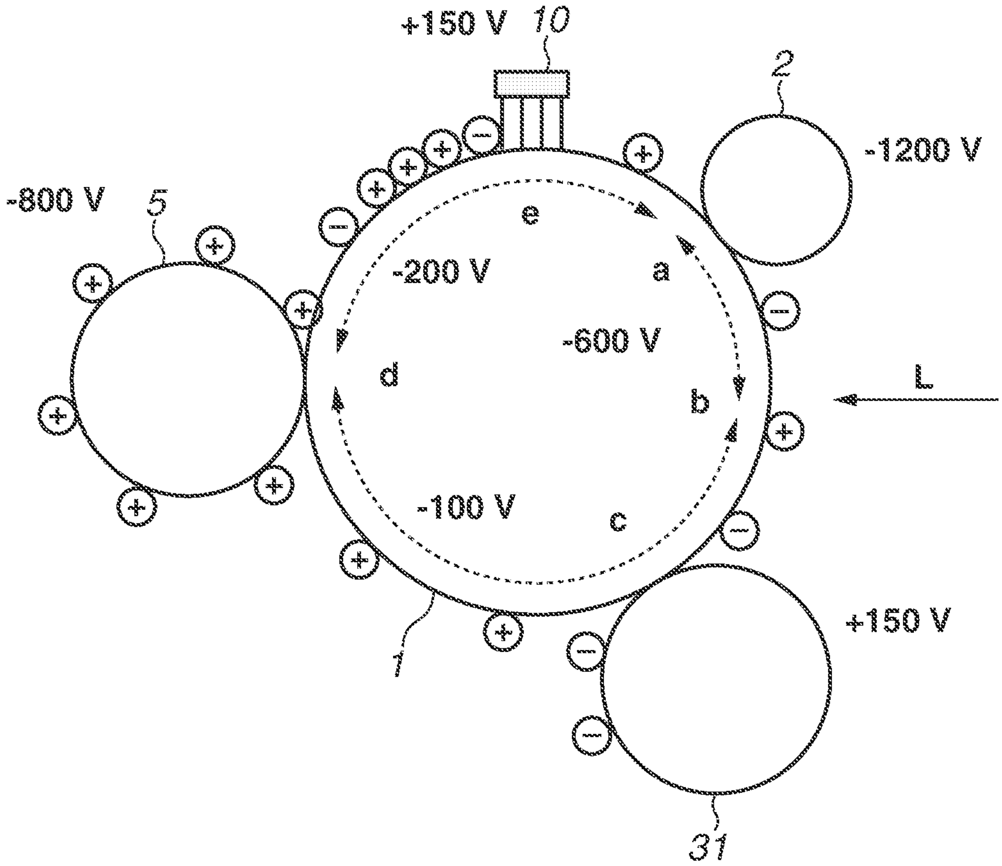
FIG. 6 is a schematic diagram illustrating a state of foreign substances around a photosensitive drum according to the first exemplary embodiment.

FIG. 6 schematically illustrates the surface potential of the photosensitive drum 1 and a state of the foreign substance on the surface of the photosensitive drum 1 at the time of drum cleaning, and positive polarity foreign substances and negative polarity foreign substances are respectively illustrated as + and − spheres. In FIG. 6, it can be seen that the negative polarity foreign substance is collected by the developing roller 31, and the positive polarity foreign substance passing through the developing portion c is transferred to the transfer roller 5.

At the timing (B) when the drum cleaning is completed, the laser exposure by the exposure device 4 is turned OFF. Accordingly, the dark portion potential Vd (−600 V) of the photosensitive drum 1 after passing through the charging portion a is maintained.

Timing (C) in FIG. 5 is timing at which the dark portion potential Vd area of the photosensitive drum 1 reaches the developing portion c. At this timing, the developing roller 31 is applied with a developing voltage Vdev01 (−300 V), which is the same as that in the image formation time. Accordingly, toner and foreign substances, which are turned to be negative, are continuously collected by a potential difference Vback (300 V) between the dark portion potential Vd of the surface of the photosensitive drum 1 and the developing voltage.

At this time, the transfer roller 5 is continuously applied with the transfer voltage Vt11 (−800 V), which is opposite to that in the image formation time. Accordingly, the positive polarity foreign substance transferred to the transfer roller 5 continuously adheres to the transfer roller 5. The surface potential of the photosensitive drum 1 is also maintained at the dark portion potential Vd (−600 V).

Timing (D) in FIG. 5 is timing at which the dark portion potential Vd area of the photosensitive drum 1 reaches the brush portion e. At this timing, the brush voltage applied to the brush member 10 is turned OFF. Accordingly, in the brush portion e, the positive polarity foreign substance continuously passes therethrough, and at the same time is physically dispersed by the brush member 10.

Timing (E) in FIG. 5 is timing at which the photosensitive drum 1 has rotated approximately three times from the timing (B) at which the drum cleaning is finished. At the timing (E), the various power supplies E1 to E4 in the control unit 150, as well as drives (not illustrated) such as the main motor 110 and a scanner motor are turned OFF, and the post-rotation process is finished.

According to the present exemplary embodiment, post-rotation process finish timing is set after the photosensitive drum 1 has rotated approximately three times after the completion of the drum cleaning, but the timing is not limited to this. Further, the main motor 110, the transfer voltage, and the brush voltage are turned OFF at the same timing, but the timing is not limited to this and may be appropriately shifted depending on, for example, inertia of the motor, falling times of the various power supplies, and the like.

7. Effect of Present Exemplary Embodiment

As described above, according to the present exemplary embodiment, in a case where it is determined that the rear side door 40 is opened and closed, the drum cleaning operation is executed in the initial sequence immediately after to remove a foreign substance adhering to the surface of the photosensitive drum 1 therefrom. Accordingly, even if a foreign substance adheres to the surface of the photosensitive drum 1, it is possible to prevent the foreign substance from firmly sticking to the photosensitive drum 1 and to suppress an image defect associated with this.

The configuration according to the present exemplary embodiment has following features. The image forming apparatus 100 that can execute an image forming operation of forming an image on a recording material P as a transferred material includes the apparatus main body 200 and the rotatable photosensitive drum 1. The image forming apparatus 100 includes the charging roller 2 as a charging member that charges the surface of the photosensitive drum 1 in the charging portion a and the exposure device 4 as an exposure unit that exposes the surface of the photosensitive drum 1 with light. The image forming apparatus 100 includes the developing roller 31 as a developing member that supplies toner on the surface of the photosensitive drum 1 charged by the charging roller 2. The image forming apparatus 100 includes the transfer roller 5 as a transfer member that forms the transfer portion d by coming into contact with the photosensitive drum 1 and transfers the toner supplied onto the photosensitive drum 1 in the transfer portion d to the recording material P. The image forming apparatus 100 includes the transfer power supply E3 that applies a voltage to the transfer roller 5 and the control unit 150 that controls the transfer power supply E3.

The image forming apparatus 100 includes the rear side door 40 that can move between the open position at which the interior of the apparatus main body 200 is exposed and the shielding position at which the interior of the apparatus main body 200 is shielded from being exposed. The image forming apparatus 100 includes the door detection sensor 120 as a detection unit that detects information regarding a first movement in which the rear side door 40 moves from the shielding position to the open position or a second movement in which the rear side door 40 moves from the open position to the shielding position. The image forming apparatus 100 includes the drive motor 110 as a drive unit that rotationally drives the photosensitive drum 1 and the control unit 150 that controls the drive motor 110 to be able to execute an image forming operation.

The control unit 150 performs control to execute a non-image forming operation different from an image forming operation.

In a case where the door detection sensor 120 detects the first movement and the second movement, the control unit 150 executes control described below. In a non-image forming operation, the control unit 150 controls to perform a rotation operation of rotating the photosensitive drum 1 at least one rotation or more in a state where the surface of the photosensitive drum 1 is exposed with light by the exposure device 4 and the transfer roller 5 is applied with a transfer voltage with a polarity different from that in the image formation time. In other words, the photosensitive drum 1 is rotated at least one rotation or more in a state where the surface of the photosensitive drum 1 is exposed with light by the exposure device 4 and a transfer voltage is applied so that an electrostatic force that causes toner charged to a positive polarity to be attracted to the transfer roller 5 is generated in the transfer portion d. Further, the photosensitive drum 1 is rotated at least one rotation or more in a state where a transfer voltage with a polarity different from the transfer voltage applied in the image forming operation. According to the present exemplary embodiment, in the rotation operation serving as the drum cleaning operation, the transfer voltage is set to a negative polarity voltage, and in the image forming operation, the transfer voltage is set to a positive polarity voltage.

According to the present exemplary embodiment, the brush member 10 is brought into contact with the photosensitive drum 1, but the present disclosure is not limited to this configuration. A configuration in which the brush member 10 is not brought into contact with the photosensitive drum 1 may be adopted. Further, the fixed brush 11 that is configured with the conductive threads 11*a* made of conductive nylon 6 woven into the base fabric 11*b* made of synthetic fibers including carbon is used, but a non-conductive brush may also be used. Further, the fixed brush 11 that is fixedly arranged to the photosensitive drum 1 is used, but, for example, a press-type brush that applies a predetermined pressure to the photosensitive drum 1 may also be used. In either case, it is sufficient to reduce an adhesion force between the foreign substance adhering to the surface of the photosensitive drum 1 and the surface of the photosensitive drum 1.

According to the present exemplary embodiment, a case where the present disclosure is applied to a DC charging type image forming apparatus is described as an example, but the present disclosure can also be applied to an alternating current (AC) charging type image forming apparatus that uses an oscillation voltage in which a DC voltage (DC component) and an AC voltage (AC component) are superimposed as a charging voltage.

According to the present exemplary embodiment, only a DC component is described regarding the developing voltage, but the developing voltage may be an oscillation voltage in which a DC voltage (DC component) and an AC voltage (AC component) are superimposed.

According to the present exemplary embodiment, toner, which is non-magnetic one-component developer, is used as developer, but magnetic one-component developer may also be used.

According to the present exemplary embodiment, the image forming apparatus 100 is provided with the photosensitive drum 1, the developing device 3, the charging roller 2, and the brush member 10, but these may also come in a form of a process cartridge. In other words, a process cartridge that is detachable from the image forming apparatus 100 and including the photosensitive drum 1, the developing device 3, the charging roller 2, and the brush member 10 may be employed. Further, a configuration may be adopted in which a drum cartridge includes the photosensitive drum 1, the charging roller 2, and the brush member 10, and a developing cartridge includes the developing device 3. In this case, both the drum cartridge and the developing cartridge may be detachable from the image forming apparatus 100, or only either one of them may be detachable from the image forming apparatus 100.

According to the present exemplary embodiment, a "cleaner-less method" configuration that does not include a cleaning unit for the photosensitive drum 1 is used, but the present disclosure is not limited to this configuration. For example, a "blade cleaning method" may be used in which a blade is used as a cleaning unit downstream of the brush member 10 and upstream of the charging roller 2 with respect to a conveyance direction of the photosensitive drum 1.

In FIGS. 4A and 4B, a door that can be opened and closed other than the rear side door 40 is not clearly illustrated as an opening/closing member, but a door other than the rear side door 40 may be provided as an opening/closing member, or only the rear side door 40 may be provided. In a case where there is no door other than the rear side door 40 that can be opened and closed, it is conceivable to perform all operations such as replacing an image forming unit in addition to the above-described jam recovery processing from the rear side door 40. According to the present exemplary embodiment, the image forming unit described here includes the photosensitive drum 1, the charging roller 2, the developing device 3, the exposure device 4, and the transfer roller 5. As described above, the photosensitive drum 1, the charging roller 2, and the developing device 3 may be collectively configured as a cartridge detachable from the image forming apparatus 100, or the photosensitive drum 1 and the charging roller 2 may be collectively configured as a drum cartridge, and the developing device 3 may be configured as a developing cartridge. On the other hand, in a case where there is a door other than the rear side door 40, the above-described jam recovery processing and a replacement operation of the image forming unit may be performed from a door other than the rear side door 40, which means that the same issue may occur in the door other than the rear side door 40 due to the above-described operation. The door other than the above-described rear side door 40 may be a front door arranged on a front side of the image forming apparatus 100, or, for example, a sheet discharge tray may also be opened and closed as the front door.

In addition, in a case where the photosensitive drum 1 is affected by insertion and removal of the sheet feeding tray 6, the above-described control may be performed upon detecting insertion and removal of the sheet feeding tray 6 by a sensor. Not only in the example of the sheet feeding tray 6, but also in a case where another door is arranged, it is desirable to provide various detection sensors and perform control as in the present exemplary embodiment. The above-described replacement of the image forming unit is replacement of a cartridge or the transfer roller 5 in the case of a monochrome image forming apparatus like the present exemplary embodiment, but, in the case of a color image forming apparatus, it also includes replacement of an intermediate transfer unit.

Next, another exemplary embodiment of the present disclosure is described. The basic configuration and operation of the image forming apparatus according to the present exemplary embodiment are the same as those of the image forming apparatus according to the first exemplary embodiment. Therefore, in the image forming apparatus according to the present exemplary embodiment, elements having the same or corresponding functions or configurations as those of the image forming apparatus according to the first exemplary embodiment are denoted by the same reference numerals as those of the image forming apparatus according to the first exemplary embodiment, and detailed descriptions thereof are omitted.

The present exemplary embodiment is characterized in that, in the initial sequence executed after a user opens and closes the rear side door 40, brush cleaning is executed to more actively discharge a foreign substance retained in the brush member 10 after drum cleaning.

Initial sequence control according to the present exemplary embodiment is described below.

<Drum Cleaning Operation>

Figure 7:
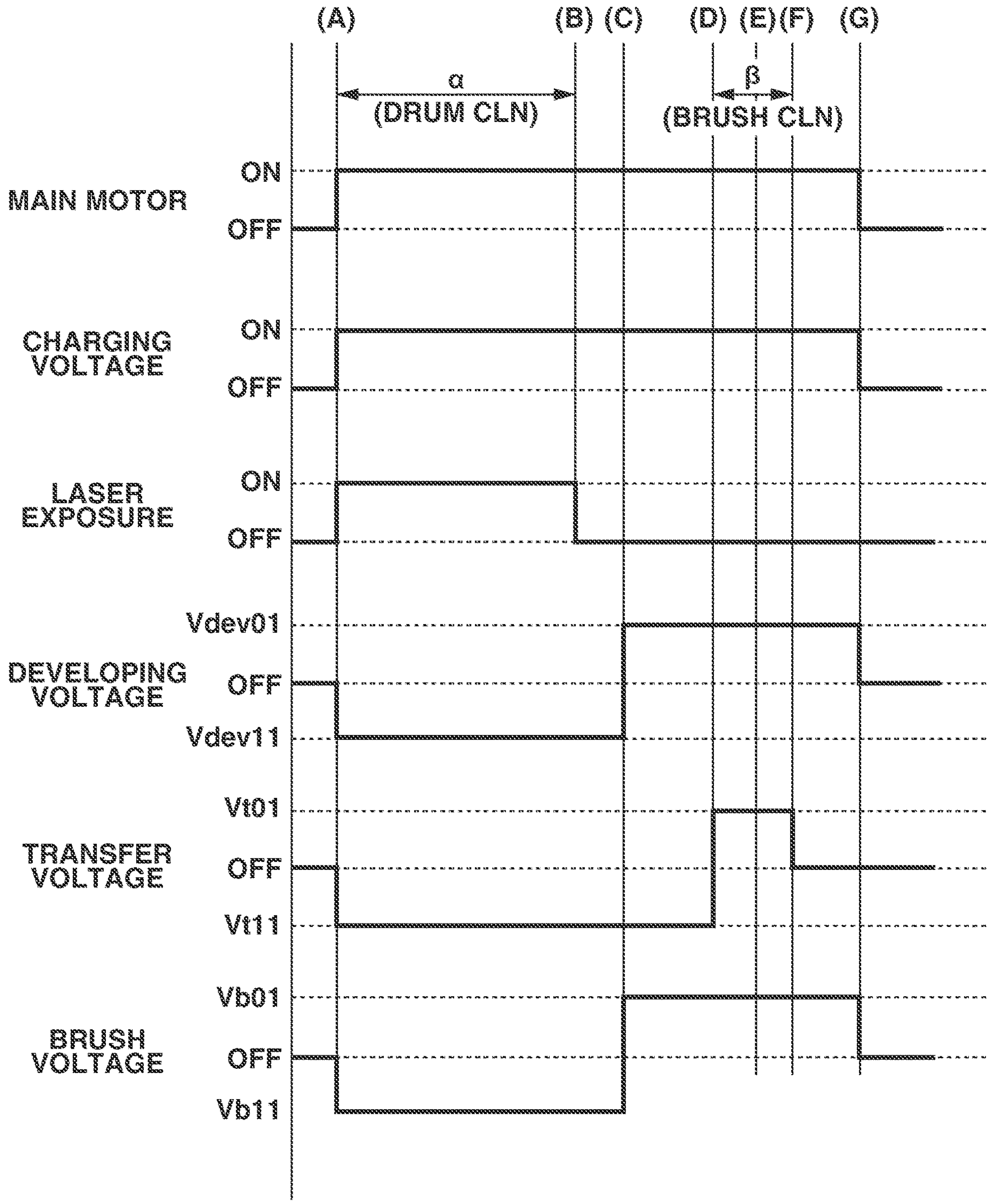
FIG. 7 is a timing chart of a non-image forming operation according to a second exemplary embodiment.

FIG. 7 is a timing chart of the initial sequence after the rear side door 40 according to the present exemplary embodiment is opened and closed.

The timing (A) to the timing (B) in FIG. 7 is the same drum cleaning as in the first exemplary embodiment, so that detailed descriptions are omitted.

The timing (C) in FIG. 7 is timing at which the dark portion potential Vd area of the photosensitive drum 1 reaches the developing portion c after the laser exposure is turned OFF at the timing (B). At this timing, the developing roller 31 is applied with the developing voltage Vdev01 (−300 V), which is the same as that in the image formation time. Accordingly, toner and foreign substances, which are turned to be negative, are continuously collected by the potential difference Vback (300 V) with the dark portion potential Vd of the surface of the photosensitive drum 1.

At the same timing (C), the brush member 10 is applied with a brush voltage Vb01 (−300 V), which is the same as that in the image formation time. Since the surface potential of the photosensitive drum 1 at this time is the light portion potential V1 (−100 V), negative polarity toner and foreign substance retained in the brush member 10 are discharged. The negative polarity toner and foreign substance discharged from the brush member 10 pass through the charging portion a and are collected by the developing roller 31 in the developing portion c.

Figure 9:
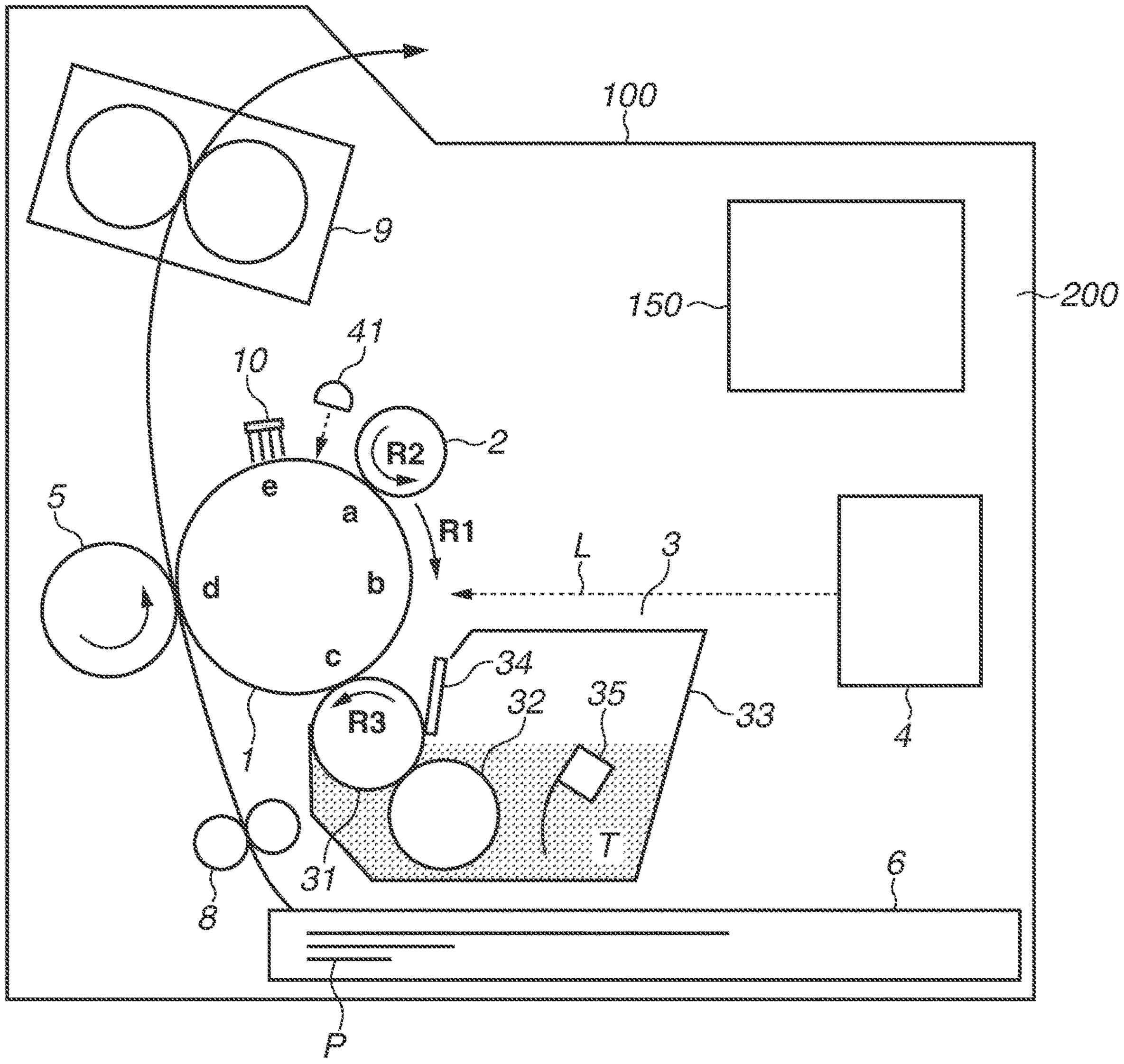
FIG. 9 is a schematic diagram illustrating arrangement of members around the photosensitive drum according to the second exemplary embodiment.

The timing (D) in FIG. 7 is timing at which the dark portion potential Vd area of the photosensitive drum 1 reaches the brush portion e. At this time, the brush member 10 is applied with the brush voltage Vb01 (−300 V). Thus, after this timing, the brush member 10 discharges the positive polarity foreign substance retained therein. The positive polarity foreign substance discharged from the brush member 10 is turned to be negative by being supplied with a negative charge from the charging roller 2 in the charging portion a and is collected by the developing roller 31 in the developing portion c. At this time, for example, the neutralization device 41 (pre-exposure device) for neutralizing the photosensitive drum 1 may be provided between the brush member 10 and the charging roller 2 as illustrated in FIG. 9, and the positive polarity foreign substance may be turned to be negative by electrically discharging in the charging section a.

At the same timing (D), it is shifted from a state in which the transfer roller 5 is applied with the transfer voltage Vt11 (−800 V), which is the same as that in the non-image formation time to a state in which the transfer roller 5 is applied with a transfer voltage Vt01 (+1000 V), which is the same as that in the image formation time. Accordingly, the positive polarity foreign substance transferred to the transfer roller 5 is transferred to the photosensitive drum 1. Further, the surface potential of the photosensitive drum 1 becomes approximately −100 V due to electric discharge on a positive polarity side in the transfer portion d. Here, a potential difference between the brush voltage when the surface of the photosensitive drum 1 applied with the transfer voltage Vt11 (−800 V) reaches the brush portion e and the surface potential of the photosensitive drum 1 is defined as a first brush potential difference.

The timing (E) in FIG. 7 is timing at which the positive polarity foreign substance discharged in the transfer portion d after the timing (D) reaches the brush portion e. At this time, the brush member 10 is applied with the brush voltage Vb01 (−300 V), so that the brush member 10 discharges the negative polarity toner and foreign substance again after this timing. On the other hand, the positive polarity foreign substance discharged from the transfer roller 5 is collected by the brush member 10. A potential difference between the brush voltage when the surface of the photosensitive drum 1 applied with the transfer voltage Vt01 (+1000 V) reaches the brush portion e in a state of being applied with the brush voltage Vb01 (−300 V) and the surface potential of the photosensitive drum 1 is defined as a second brush potential difference.

The control unit 150 controls the potential difference between the brush voltage and the surface potential of the photosensitive drum 1 so that it changes from the first brush potential difference to the second brush potential difference in a case where a second rotation operation serving as a brush cleaning operation is executed after a first rotation operation serving as the drum cleaning operation. Specifically, the first brush potential difference is that the brush voltage is −300 V, and the surface potential of the photosensitive drum 1 is −600 V, and thus is a potential difference to which an electrostatic force acts that causes the toner charged to the negative polarity, which is the normal polarity, to move from the surface of the photosensitive drum 1 to the brush member 10. Further, the second brush potential difference is that the brush voltage is −300 V, and the surface potential of the photosensitive drum 1 is −100 V, and thus is a potential difference to which an electrostatic force acts that causes the toner charged to the negative polarity, which is the normal polarity, to move from the brush member 10 to the surface of the photosensitive drum 1. Here, toner is described as a substance with a polarity, but it goes without saying that similar behavior will occur if it is replaced with the polarity of the above-described foreign substance.

Figure 8:
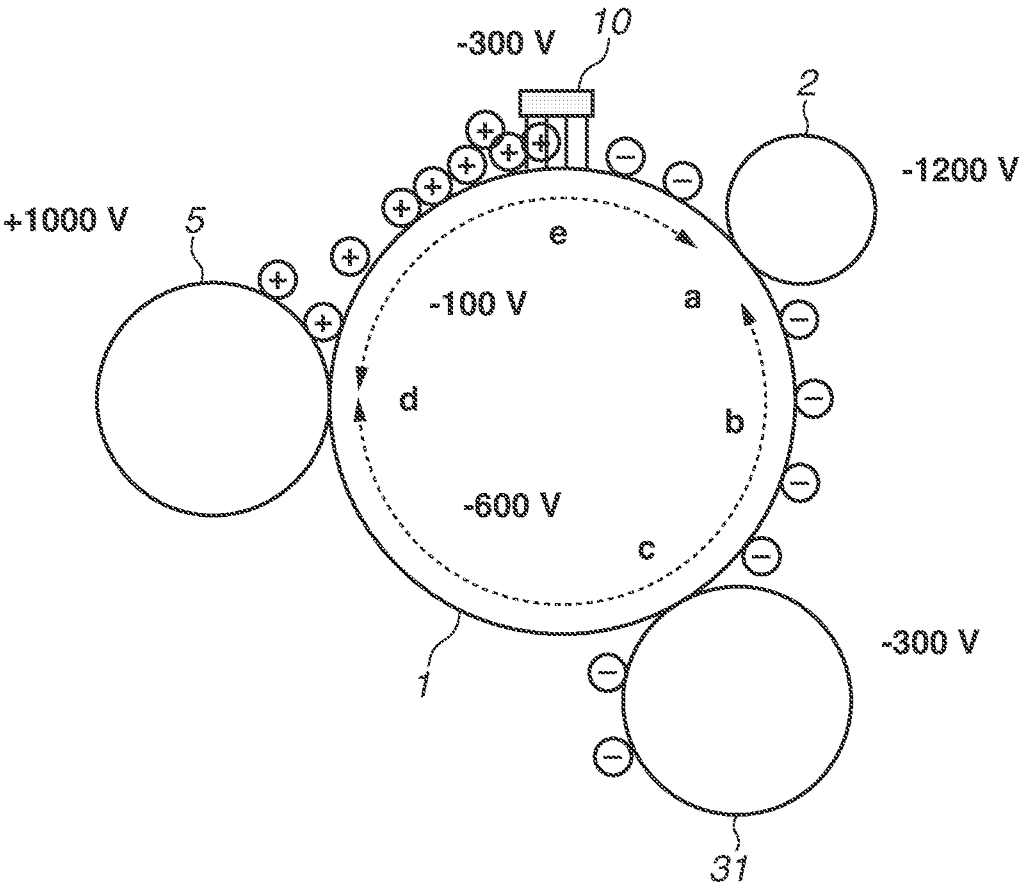
FIG. 8 is a schematic diagram illustrating a state of foreign substances around a photosensitive drum according to the second exemplary embodiment.

FIG. 8 schematically illustrates the surface potential of the photosensitive drum 1 and a state of the foreign substance on the surface of the photosensitive drum 1 at this time, and positive polarity foreign substance and negative polarity foreign substances are respectively illustrated as + and − spheres. In FIG. 8, it can be seen that the positive polarity foreign substance discharged from the transfer roller 5 is collected by the brush member 10, and the negative polarity foreign substance discharged from the brush member 10 is collected by the developing roller 31.

Timing (F) in FIG. 7 is timing at which the transfer roller 5 has rotated one rotation from the timing (D) at which the transfer voltage is switched to Vt01, and a transfer voltage Vt applied to the transfer roller 5 is turned OFF at this timing. After the timing (F), electric discharge on the positive polarity side in the transfer portion d ends, and the surface potential of the photosensitive drum 1 maintains a state of the dark portion potential Vd.

As described above, the brush member 10 lets the positive polarity foreign substance on the photosensitive drum 1 pass until the timing (C) in FIG. 7 and discharges the negative polarity toner and foreign substance retained in the brush member 10 from the timing (C) to the timing (D). Subsequently, the brush member 10 discharges the positive polarity foreign substance after the timing (D) and discharges the negative polarity toner and foreign substance after the timing (E). At the timing (E), the surface potential of the photosensitive drum 1 is controlled without changing the brush voltage applied to the brush member 10, so that the polarity of the foreign substance discharged from the brush member 10 is changed. According to the present exemplary embodiment, an operation from the timing (D) to the timing (F) of discharging foreign substances with positive and negative polarities is referred to as a brush cleaning operation as a rotation operation. If the drum cleaning operation according to the first exemplary embodiment is regarded as the first rotation operation, and the brush cleaning operation according to the second exemplary embodiment is regarded as the second rotation operation, the control unit 150 performs control to execute the first rotation operation and then the second rotation operation. In FIG. 7, a time ß from the timing (D) to the timing (F) is a brush cleaning time. The brush voltage during the brush cleaning operation is increased to the negative polarity side with respect to the drum cleaning operation time, and thus makes it easier to discharge the negative polarity toner and foreign substance retained in the brush member 10.

According to the present exemplary embodiment, a polarity of a foreign substance to be discharged from the brush member 10 is changed by controlling the surface potential of the photosensitive drum 1 without changing the brush voltage, but the present disclosure is not limited to this.

For example, the polarity of the foreign substance to be discharged from the brush member 10 may be changed by changing the brush voltage. Further, according to the present exemplary embodiment, the brush voltage is increased to the negative polarity side with respect to the drum cleaning operation and thus makes it easier to discharge the negative polarity toner and foreign substances, but the present disclosure is not limited to this. For example, the second brush potential difference, which is a potential difference Δ with respect to the surface potential of the photosensitive drum 1 may be set to be increased to the negative polarity side.

Timing (G) in FIG. 7 is timing at which the negative polarity toner and foreign substance discharged from the brush member 10 after the timing (E) are collected by the developing roller 31. At the timing (G), the various power supplies E1 to E4 in the control unit 150, as well as drives (not illustrated) such as the main motor 110 and the scanner motor are turned OFF, and the post-rotation process is finished.

8. Effect of Present Exemplary Embodiment

As described above, according to the present exemplary embodiment, in a case where it is detected that the rear side door 40 is opened and closed, the drum cleaning operation is executed in the initial sequence immediately after to remove the foreign substance adhering to the surface of the photosensitive drum 1 therefrom. Subsequently, the brush cleaning operation is executed to discharge a positive polarity foreign substance and negative polarity toner and foreign substance retained in the brush member 10. Accordingly, a foreign substance is prevented from firmly sticking to the photosensitive drum 1, and a substance retained in the brush member 10 is removed, so that it is possible to suppress an image defect due to adhesion of a foreign substance.

According to the present exemplary embodiment, the drum cleaning operation is executed, and then the brush cleaning operation is executed in the initial sequence, but the present disclosure is not limited to this. The drum cleaning operation may be executed after the brush cleaning operation is executed, and a repeat operation may be performed in which the brush cleaning is executed again after that. In other words, the control unit 150 may perform control to execute the first rotation operation after the second rotation operation or perform control to execute the second rotation operation after the first rotation operation and then execute the first rotation operation.

The time and number of drum cleaning operations and brush cleaning operations may be varied depending on a use environment and the number of sheets on durability of the image forming apparatus 100. For example, a foreign substance is likely to be adsorbed to the photosensitive drum 1 in a high humidity environment, so that the drum cleaning time may be extended depending on detection by an environmental sensor or the like.

According to the present disclosure, it is possible to suppress an image defect due to failure occurring in a photosensitive drum.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-027943, filed Feb. 27, 2023, which is hereby incorporated by reference herein in its entirety.

What is claimed is:

1. An image forming apparatus to perform an image forming operation of forming an image on a transferred material, the image forming apparatus comprising:

a photosensitive drum that is rotatable;

a charging member configured to charge a surface of the photosensitive drum in a charging portion;

an exposure unit configured to expose the surface of the photosensitive drum with light;

a developing member configured to supply toner onto the surface of the photosensitive drum charged by the charging member;

a transfer member configured to form a transfer portion by coming into contact with the photosensitive drum and to transfer the toner supplied onto the photosensitive drum to a transferred material in the transfer portion;

a transfer voltage applying unit configured to apply a transfer voltage to the transfer member;

an opening/closing member configured to move between an open position where an interior of the image forming apparatus is exposed and a shielding position where the interior of the image forming apparatus is shielded from being exposed;

a detection unit configured to detect information regarding a first movement in which the opening/closing member moves from the shielding position to the open position or a second movement in which the opening/closing member moves from the open position to the shielding position;

a drive unit configured to rotationally drive the photosensitive drum; and a control unit configured to control the transfer voltage applying unit and the drive unit, wherein the control unit is configured to perform control to execute the image forming operation and a non-image forming operation different from the image forming operation, and wherein, in a case where the detection unit detects the first movement and the second movement, in the non-image forming operation, the control unit controls to perform a rotation operation of rotating the photosensitive drum at least one rotation or more in a state where the surface of the photosensitive drum is exposed with light by the exposure unit and the transfer voltage is applied so that an electrostatic force that causes toner charged to a positive polarity to be attracted to the transfer member is generated in the transfer portion.

2. The image forming apparatus according to claim 1, further comprising:

a brush configured to form a brush portion by coming into contact with the surface of the photosensitive drum downstream of the transfer portion and upstream of the charging portion in a rotation direction of the photosensitive drum; and a brush voltage applying unit configured to apply a brush voltage to the brush.

3. The image forming apparatus according to claim 2, wherein the brush has conductivity and is arranged by being fixed to a support member of the photosensitive drum.

4. The image forming apparatus according to claim 2, wherein the brush is a press-type brush configured to apply a predetermined pressure to the photosensitive drum using a pressure spring.

5. The image forming apparatus according to claim 2, wherein, in the brush portion, a potential difference in which the brush voltage is increased in a positive polarity side with respect to a surface potential of the photosensitive drum is defined as a first brush potential difference, and a potential difference in which the brush voltage is increased in a negative polarity side with respect to the surface potential of the photosensitive drum is defined as a second brush potential difference, and wherein the control unit is configured to perform control to execute the rotation operation of the photosensitive drum and then to change the first brush potential difference to the second brush potential difference.

6. The image forming apparatus according to claim 5, wherein the control unit controls the surface potential of the photosensitive drum to change from the first brush potential difference to the second brush potential difference.

7. The image forming apparatus according to claim 5, wherein the control unit controls the brush voltage to change from the first brush potential difference to the second brush potential difference.

8. The image forming apparatus according to claim 7, wherein the control unit controls a brush voltage at a time of controlling the first brush potential difference to change to the second brush potential difference to be applied as a brush voltage that is larger on the negative polarity side with respect to the brush voltage applied in the rotation operation.

9. The image forming apparatus according to claim 2, wherein density of the brush is 150 kF/inch$^2$ or more.

10. The image forming apparatus according to claim 1, wherein the toner is one-component developer.

11. The image forming apparatus according to claim 1, wherein the charging member is configured to come into contact with the surface of the photosensitive drum to form the charging portion.

12. An image forming apparatus to perform an image forming operation of forming an image on a transferred material, the image forming apparatus comprising:

a photosensitive drum that is rotatable;

a charging member configured to charge a surface of the photosensitive drum in a charging portion;

an exposure unit configured to expose the surface of the photosensitive drum with light;

a developing member configured to supply toner onto the surface of the photosensitive drum charged by the charging member;

a transfer member configured to form a transfer portion by coming into contact with the photosensitive drum and to transfer the toner supplied onto the photosensitive drum to a transferred material in the transfer portion;

a transfer voltage applying unit configured to apply a transfer voltage to the transfer member;

an opening/closing member configured to move between an open position where an interior of the image forming apparatus is exposed and a shielding position where the interior of the image forming apparatus is shielded from being exposed;

a detection unit configured to detect information regarding a first movement in which the opening/closing member moves from the shielding position to the open position or a second movement in which the opening/closing member moves from the open position to the shielding position;

a drive unit configured to rotationally drive the photosensitive drum; and a control unit configured to control the transfer voltage applying unit and the drive unit, wherein the control unit is configured to perform control to execute the image forming operation and a non-image forming operation different from the image forming operation, and wherein, in a case where the detection unit detects the first movement and the second movement, in the non-image forming operation, the control unit controls to perform a rotation operation of rotating the photosensitive drum at least one rotation or more in a state where the surface of the photosensitive drum is exposed with light by the exposure unit and the transfer voltage with a polarity different from that of the transfer voltage applied in the image forming operation.

13. The image forming apparatus according to claim 12, further comprising:

a brush configured to form a brush portion by coming into contact with the surface of the photosensitive drum downstream of the transfer portion and upstream of the charging portion in a rotation direction of the photosensitive drum; and a brush voltage applying unit configured to apply a brush voltage to the brush.

14. The image forming apparatus according to claim 13, wherein the brush has conductivity and is arranged by being fixed to a support member of the photosensitive drum.

15. The image forming apparatus according to claim 13, wherein the brush is a press-type brush configured to apply a predetermined pressure to the photosensitive drum using a pressure spring.

16. The image forming apparatus according to claim 13, wherein, in the brush portion, a potential difference in which the brush voltage is increased in a positive polarity side with respect to a surface potential of the photosensitive drum is defined as a first brush potential difference, and a potential difference in which the brush voltage is increased in a negative polarity side with respect to the surface potential of the photosensitive drum is defined as a second brush potential difference, and wherein the control unit is configured to perform control to execute the rotation operation of the photosensitive drum and then to change the first brush potential difference to the second brush potential difference.

17. The image forming apparatus according to claim 16, wherein the control unit controls the surface potential of the photosensitive drum to change from the first brush potential difference to the second brush potential difference.

18. The image forming apparatus according to claim 16, wherein the control unit controls the brush voltage to change from the first brush potential difference to the second brush potential difference.

19. The image forming apparatus according to claim 18, wherein the control unit controls a brush voltage at a time of controlling the first brush potential difference to change to the second brush potential difference to be applied as a brush voltage that is larger on the negative polarity side with respect to the brush voltage applied in the rotation operation.

20. The image forming apparatus according to claim 13, wherein density of the brush is 150 $kF/inch^2$ or more.

21. The image forming apparatus according to claim 12, wherein the toner is one-component developer.

22. The image forming apparatus according to claim 12, wherein the charging member is configured to come into contact with the surface of the photosensitive drum to form the charging portion.

* * * * *